United States Patent
Chang et al.

(10) Patent No.: US 11,338,645 B2
(45) Date of Patent: May 24, 2022

(54) METHOD AND APPARATUS FOR ACTIVE VEHICLE CABIN OCCUPANT DETECTION SYSTEM

(71) Applicant: GM GLOBAL TECHNOLOGY OPERATIONS LLC, Detroit, MI (US)

(72) Inventors: Insu Chang, Troy, MI (US); Edward R. Masters, Brighton, MI (US); Zhe Li, Pudong (CN); Dooil Hwang, Rochester Hills, MI (US); Donald K. Grimm, Utica, MI (US); Jeremie Dernotte, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 463 days.

(21) Appl. No.: 16/450,091

(22) Filed: Jun. 24, 2019

(65) Prior Publication Data

US 2020/0398637 A1    Dec. 24, 2020

(51) Int. Cl.

| | |
|---|---|
| *G06F 7/00* | (2006.01) |
| *B60H 1/00* | (2006.01) |
| *G08B 21/02* | (2006.01) |
| *G08B 21/22* | (2006.01) |
| *H04W 4/90* | (2018.01) |
| *B60N 2/00* | (2006.01) |
| *B60R 11/04* | (2006.01) |
| *B60R 11/00* | (2006.01) |

(52) U.S. Cl.
CPC ......... *B60H 1/00742* (2013.01); *G08B 21/02* (2013.01); *G08B 21/22* (2013.01); *H04W 4/90* (2018.02); *B60H 1/008* (2013.01); *B60N 2/002* (2013.01); *B60R 11/04* (2013.01); *B60R 2011/0003* (2013.01)

(58) Field of Classification Search
CPC .... B60H 1/00742; B60H 1/008; G08B 21/02; G08B 21/22; H04W 4/90
USPC .......................................................... 701/36
See application file for complete search history.

(56) References Cited

U.S. PATENT DOCUMENTS

| | | | |
|---|---|---|---|
| 6,811,201 B2 | 11/2004 | Naik | |
| 6,922,622 B2 * | 7/2005 | Dulin | .................... B06B 1/0215 |
| | | | 180/272 |
| 9,000,907 B1 * | 4/2015 | Rembach | ............... B60N 2/002 |
| | | | 340/565 |
| 9,227,484 B1 * | 1/2016 | Justice | ............... B60H 1/00742 |
| 9,796,371 B2 * | 10/2017 | Soifer | ............... B60H 1/00742 |
| 2002/0161501 A1 * | 10/2002 | Dulin | ................. B60H 1/00742 |
| | | | 701/45 |
| 2016/0272112 A1 * | 9/2016 | DeGrazia | ................. B60Q 9/00 |

(Continued)

*Primary Examiner* — Tai T Nguyen
(74) *Attorney, Agent, or Firm* — Lorenz & Kopf LLP (57) ABSTRACT

Methods and apparatus are provided for active vehicle cabin occupant detection system. The method includes predicting the presence of a vehicle occupant during operation of a vehicle in response to a door sensor indicative of a door opening, a carbon dioxide level and a pressure sensor in a passenger seat indicative of the vehicle occupant in the passenger seat, detecting the presence of the vehicle occupant using a vehicle cabin motion detector in response to the vehicle being shutdown, confirming the presence of the vehicle occupant using an infrared camera to detect a thermal signature of the vehicle occupant in response to the predicted presence of the vehicle occupant, and transmitting an alert via a wireless transmitter indicative of the presence of the vehicle occupant.

20 Claims, 5 Drawing Sheets

(56) References Cited

U.S. PATENT DOCUMENTS

2017/0240022 A1* 8/2017 Ireri .................. B60H 1/00778
2019/0077217 A1  3/2019 Yu et al.
2020/0094709 A1* 3/2020 Dutkin .................. G08B 21/22

* cited by examiner

METHOD AND APPARATUS FOR ACTIVE VEHICLE CABIN OCCUPANT DETECTION SYSTEM

The present disclosure relates generally to a system for vehicle occupant detection. More specifically, aspects of the present disclosure relate to systems, methods and devices for detecting an occupant in a vehicle using an artificial intelligence algorithm, engaging a predetection method and confirming visual detectors and driving patterns.

Extreme vehicle cabin temperatures resulting from solar radiation and lack of ventilation may result in occupant injury or death. The temperature increases in the vehicle cabin are intensified by solar radiation passing through the car glass surfaces, such as windows, windshields, and glass roof panels. Solar radiation passing through these glass surfaces may be absorbed by materials in the cabin such as the dashboard, seats, and other interior panels and surfaces which are often dark colors and thus absorb more energy. These hot surfaces then contribute to the increased temperatures within the vehicle cabin.

Increased vehicle cabin temperatures provide a threat to children or pets forgotten, left intentionally or trapped in a vehicle who then face the risk of a heat stroke. Numerous infant and pet fatalities occur each year as a result of being left inside a vehicle during hot or sunny days. A distracted caregiver or an unexpected event can lead to such a situation. It would be desirable to provide a robust system to address temperature increase within a vehicle cabin when occupants are present to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are methods and systems and related control logic for provisioning computational systems, methods for making and methods for operating such systems, and motor vehicles equipped with onboard control systems. By way of example, and not limitation, there is presented various embodiments of vehicle interior temperature control to protect vehicle occupants are disclosed herein.

In accordance with an aspect of the present invention an occupant detection system in a vehicle comprising a GPS sensor for detecting a vehicle location during operation of the vehicle, a door sensor for detecting a vehicle door state, a pressure sensor for detecting a vehicle seat usage in response to a weight on a vehicle seat, a motion sensor within a vehicle cabin for detecting a presence of the vehicle occupant, an infrared camera for detecting a thermal signature of the vehicle occupant, a processor operative to predict a predicted presence of the vehicle occupant in response to the vehicle location, the vehicle door state, and the vehicle seat usage and for initiating the use of the infrared camera to confirm the presence of the vehicle occupant in response to the predicted presence, and a transmitter for transmitting an alert in response to a detection of the thermal signature of the vehicle occupant.

In accordance with another aspect of the present invention wherein the vehicle location during operation of the vehicle is indicative of a school.

In accordance with another aspect of the present invention wherein the vehicle door state is indicative of a passenger door opening and closing.

In accordance with another aspect of the present invention including a vehicle ignition switch having an off position wherein the motion sensor is operative to detect the presence of the vehicle occupant in response to the vehicle ignition switch being placed in the off position.

In accordance with another aspect of the present invention including a CO sensor and wherein the predicted presence of the vehicle occupant is detected in response to a CO level measured by the CO sensor.

In accordance with another aspect of the present invention including an HVAC system and wherein the HVAC system is engaged to reduce a temperature of the vehicle cabin in response to the detection of the thermal signature of the vehicle occupant.

In accordance with another aspect of the present invention wherein the alert is transmitted to an emergency services provider.

In accordance with another aspect of the present invention wherein the alert is transmitted to a mobile device.

In accordance with another aspect of the present invention a method including predicting the presence of a vehicle occupant during operation of a vehicle in response to a door sensor indicative of a door opening and a pressure sensor in a passenger seat indicative of the vehicle occupant in the passenger seat, detecting the presence of the vehicle occupant using a vehicle cabin motion detector in response to the vehicle being shutdown, confirming the presence of the vehicle occupant using an infrared camera to detect a thermal signature of the vehicle occupant in response to the predicted presence of the vehicle occupant, and transmitting an alert via a wireless transmitter indicative of the presence of the vehicle occupant.

In accordance with another aspect of the present invention wherein the alert is transmitted to an emergency service provider.

In accordance with another aspect of the present invention wherein the alert is transmitted to a mobile device.

In accordance with another aspect of the present invention wherein the prediction of the presence of a vehicle occupant is made in response to a trip point of origin.

In accordance with another aspect of the present invention wherein the prediction of the presence of the vehicle occupant is made in response to a carbon dioxidelevel measured by a vehicle cabin carbon dioxidedetector.

In accordance with another aspect of the present invention including engaging an HVAC system in response to confirming the presence of the vehicle occupant.

In accordance with another aspect of the present invention wherein the prediction of the presence of the vehicle occupant is made in response to a driving pattern indicative of the vehicle occupant.

In accordance with another aspect of the present invention a method of detecting a vehicle occupant in a vehicle cabin comprising predicting a presence of the vehicle occupant during operation of the vehicle in response to a dynamic behavior of the vehicle during operation indicative of a vehicle occupant, confirming the presence of the vehicle occupant in response to a thermal image captured by a camera within the vehicle cabin, wherein the confirming the presence of the vehicle occupant is made in response to the vehicle being in a nonoperational mode, and transmitting an alert using a wireless transmitter in response to confirming the presence of the vehicle occupant.

In accordance with another aspect of the present invention including activating an HVAC system in response to confirming the presence of the vehicle occupant.

In accordance with another aspect of the present invention including predicting a presence of the vehicle occupant is made in response to a point of origin of operation of the vehicle.

In accordance with another aspect of the present invention further including detecting the presence of the vehicle occupant in response to a motion detector within the vehicle cabin and wherein the detecting the vehicle occupant is made in response to the vehicle being in a nonoperational mode.

In accordance with another aspect of the present invention further including detecting the presence of the vehicle occupant in response to a motion detector within the vehicle cabin and wherein the detecting the vehicle occupant is made in response to the vehicle being in a nonoperational mode and a vehicle cabin door being locked.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
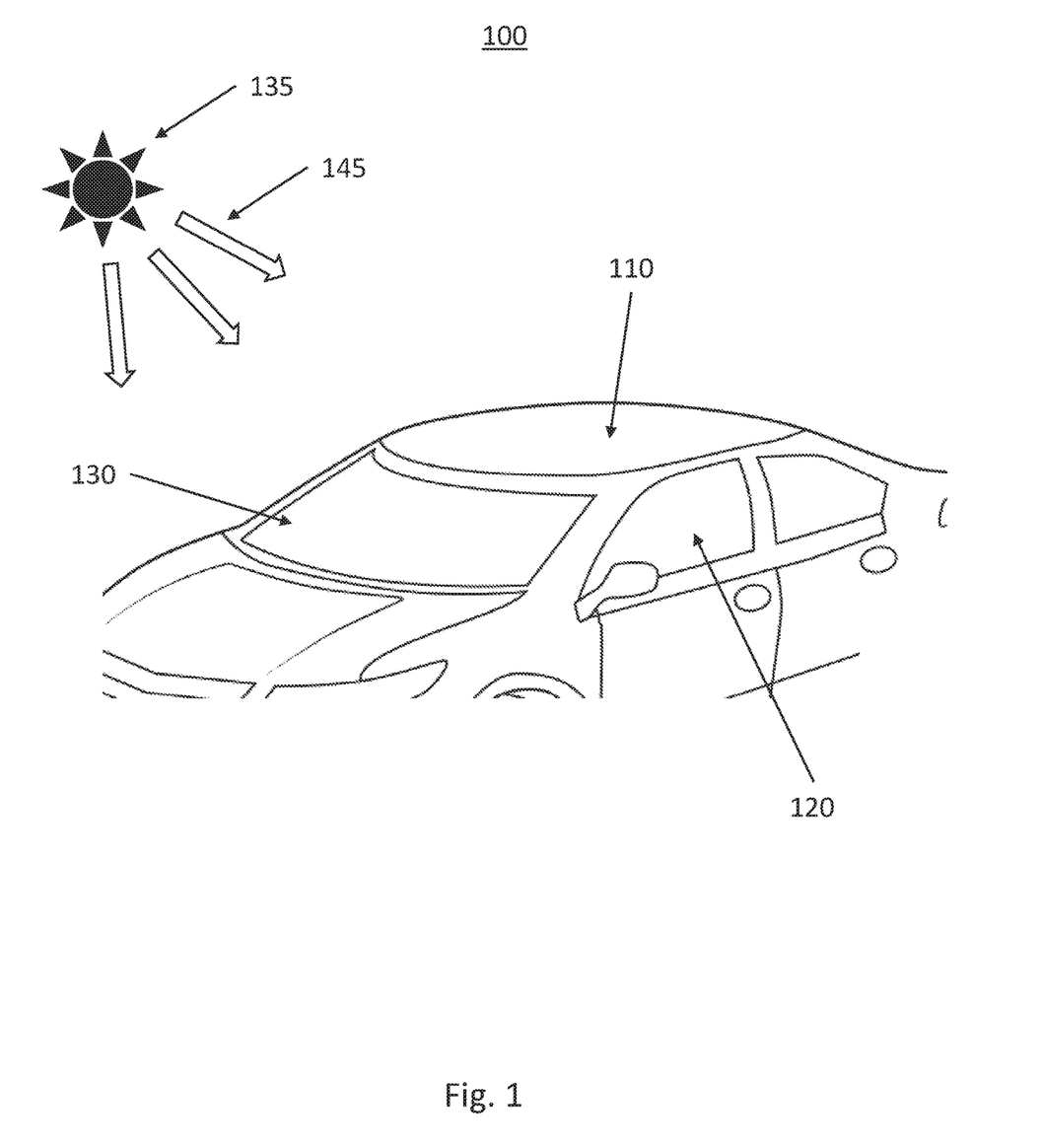
FIG. 1 shows an application for the method and apparatus for active vehicle cabin occupant detection according to an exemplary embodiment of the present disclosure.

Turning now to FIG. 1, an environment for a system 100 for active vehicle cabin occupant detection according to an exemplary embodiment of the present disclosure is shown. The exemplary environment 100 includes a vehicle 110 having a first glass surface 120, such as a window, and a second glass surface 130, such as a windshield. The vehicle 110 and second glass surface 130 are in a direct path of solar radiation 145 from the sun 135. The vehicle 110 is equipped with an active vehicle cabin occupant detection system according to an exemplary embodiment of the present disclosure.

Currently, there is no robust system to detect vehicle cabin occupants and address the temperature increase within a vehicle 110 when the vehicle is parked, all the windows are closed, the ventilation system is inactive and it is exposed to solar radiation 145 from the sun 135. The disclosed system and method are an active heat protection technology operative to prevent heat-stroke from occupants, such as infants and pets, left or forgotten in a vehicle 110. The system is operative to automatically detect an occupant inside a vehicle and control air temperature and air quality when the occupant is detected. In this exemplary embodiment a driver parks a car either in an open space, such as a parking lot, or closed space, such as a garage, and the system is operative to determine if there is an occupant remaining in the vehicle 110 in response to data collected during operation of the vehicle, such as trip origin, trip destination, door operation, HVAC settings, etc. The system is then operative to automatically control sun shades, fans, and the air conditioner to control vehicle cabin temperature. In addition, the system may be operative to communicate with the driver, a networked service provider, such as OnStar, and/or local emergency services, such as the police, to provide an alert of the remaining vehicle occupant. If the car is in a closed space, the system may be operative to determine a carbon dioxide level. If carbon dioxide above a predetermined threshold is detected inside the vehicle, the engine may be turned off and the networked service provider or emergency services are immediately contacted.

Figure 2:
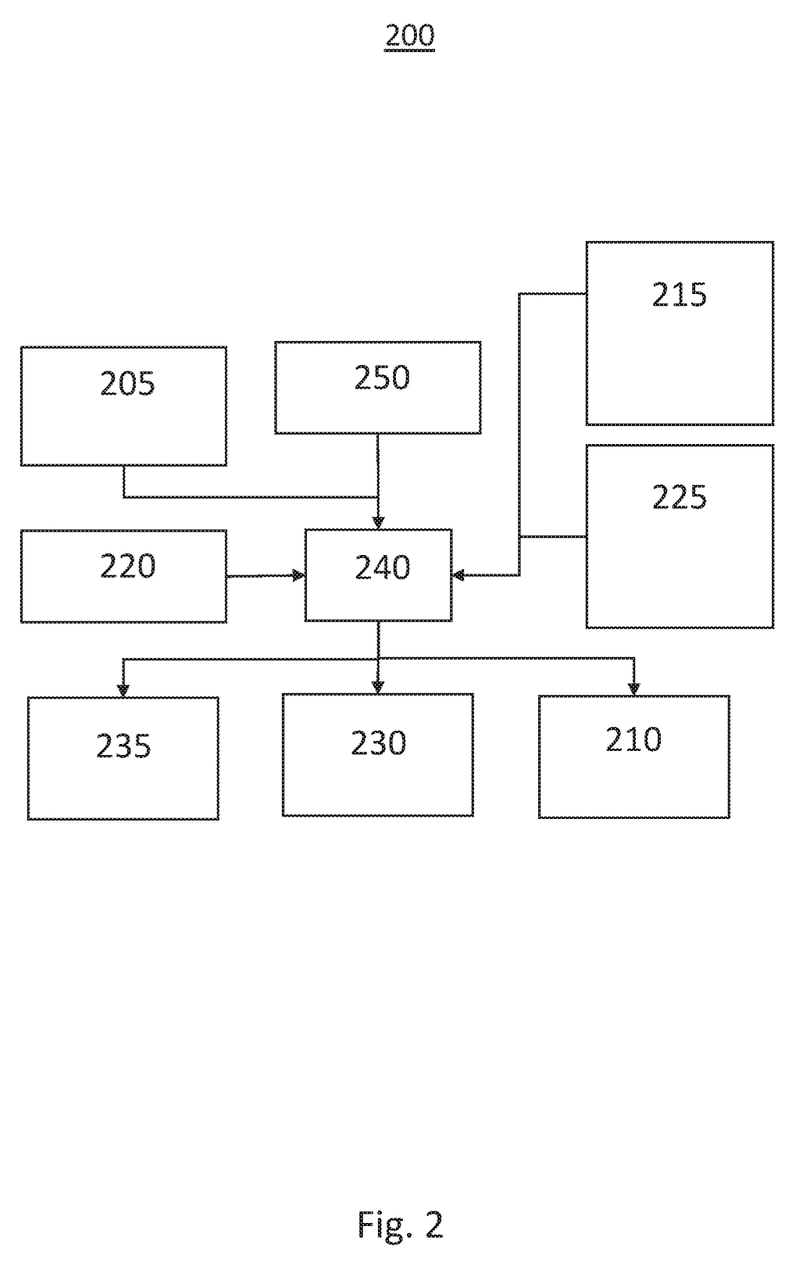
FIG. 2 shows a block diagram illustrating a system for active vehicle cabin occupant detection according to an exemplary embodiment of the present disclosure.

Turning now to FIG. 2, a block diagram of an exemplary system for active vehicle cabin occupant detection 200 according to an exemplary embodiment of the present disclosure is shown. The exemplary system 200 includes an occupancy detector 205, a vehicle controller 210, an exterior temperature sensor 215, a light sensor 220, an interior temperature sensor 225, a sunshade controller 230, an HVAC controller 235, a processor 240 and a global positioning system (GPS) 250.

The light sensor 220, or a sun load sensor, may be a photo diode or similar device, and is used to detect light levels. The light sensor 220 may be located on a dashboard, inside a glass surface, such as the windshield, or on the top of the vehicle. As the sunlight intensity incident on the light sensor increases, the light sensor's signal voltage changes. This signal voltage is coupled to the processor 240 for estimating the sunlight intensity.

The exterior temperature sensor 215 is operative to generate a signal indicative of an ambient temperature outside of the vehicle. The exterior temperature sensor 215 may be a thermocouple or the like operative to generate an electrical signal in response to changes in temperature. The exterior temperature sensor 215 is located outside of the vehicle cabin and ideally not in a location subject to direct sunlight or subject to thermal radiation from other vehicle components. The electrical signal is then coupled to the processor 240 for use by the algorithm performing the disclosed methods.

Likewise, the interior temperature sensor 225 is located inside the vehicle cabin in a location not subject to direct sunlight or thermal radiation from other vehicle components. The interior temperature sensor 225 may be a thermocouple or the like operative to generate an electrical voltage indicative of the vehicle cabin internal temperature. The electrical voltage is then coupled to the processor 240 for use by the algorithm performing the disclosed methods.

The system further includes an occupancy detector 205 for detecting the presence of a vehicle occupant. The occupancy detector 205 is operative to detect a live object in a vehicle by using multiple sensors and increases the detectability of cabin occupant. The occupancy detector 205 may include an occupancy detection processor operative to run a pre-detection algorithm using artificial intelligence technology to check any abnormal door usage or distraction of the driver. In an exemplary embodiment, when the vehicle is stopped or parked, or the engine is stopped, the occupancy detector 205 is then operative to sense any dynamic behavior of a potential vehicle occupant by using a motion sensor. The occupancy detector 205 may include a motion detector for detecting motion within the vehicle cabin. The occupancy detector 205 may include an acoustic sensor can detect any sound, such as crying, talking, barking, etc., inside the vehicle cabin. The occupancy detector 205 may include gravity, or pressure, sensors in the vehicle seats to detect any additional weight on the seats. In an exemplary embodiment, the occupancy detector 205 may include a camera or an infrared camera for detecting a vehicle occupant. The camera or infrared camera may be used to confirm the motion/sound, or weight are from a live object, such as a human or pet, and the infrared camera used to check any thermal emission from the object.

The processor 240 is operative to perform the algorithm for active vehicle cabin occupant protection. According to an exemplary embodiment, the processor 240 is first operative to detect if a driver is in the vehicle. This detection may be made in response to a signal from the occupancy detector 205. If the driver is estimated to not be present, the processor 240 is then operative to determine if the engine of the vehicle is running. The vehicle run state may be determined in response to a signal or a query to the vehicle controller 210 or by determining the position of the vehicle ignition switch. For example, if the vehicle ignition switch is in the off or lock position, the processor 240 may assume that the engine is not running. The processor 240 may further detect the voltage output of the alternator to determine if the engine is running. The processor 240 may query a vehicle controller 210 to determine the run state of the vehicle.

The processor 240 may further be operative to initiate cabin heat in response to the exterior temperature being less than a predetermined level and/or the interior temperature being less than a predetermined level, the driver not being present, and an occupant detected in the vehicle. In this exemplary embodiment, the processor 240 would generate a control signal to couple to the vehicle controller 210 which would then start the engine of the vehicle and generate an additional control signal to couple to the HVAC controller 230 to engage the HVAC system to increase the temperature within the vehicle cabin to a predetermined minimum temperature.

The processor 240 may be further operative to determine if an automatic window power sunshade system should be engaged. The processor 240 is operative to estimate a sunlight intensity on the vehicle indicative of direct sun exposure of the vehicle in response to an output from the light sensor 220 and/or in response to a GPS signal from the GPS 250 and time and date and vehicle orientation. If the processor estimates that the vehicle is in direct sunlight and therefore the cabin is subject to heat generated from solar radiation entering the vehicle cabin, the processor 220 is then operative to generate a control signal to couple to the sunshade controller 230 to engage the required automatic sunshades. The processor 240 may be further operative to monitor the outside temperature, interior temperature and time of day in order to disengage the automatic sunshades if they are no longer required or to engage additional or alternative sunshades at different times of day as the sun moves relative to the vehicle.

The sunshade controller 225 is operative to engage the required sunshades for the automatic window power sunshade system in response to a control signal from the processor 220. In an exemplary embodiment, a vehicle may be equipped with a windshield sunshade, a right sunshade, a left sunshade and a rear sunshade. The control signal may be indicative of which of the various sunshades to engage, such as the windshield sunshade, or may be indicative of a sun location and vehicle orientation. In response to the sun location and vehicle orientation information the sunshade controller 225 may then be operative to determine which sunshades should be engaged to increased vehicle interior temperature resulting from solar radiation. The sunshade controller 225 is then operative to generate control signals to couple to the required sunshades such that the required sunshades are engaged.

Figure 3:
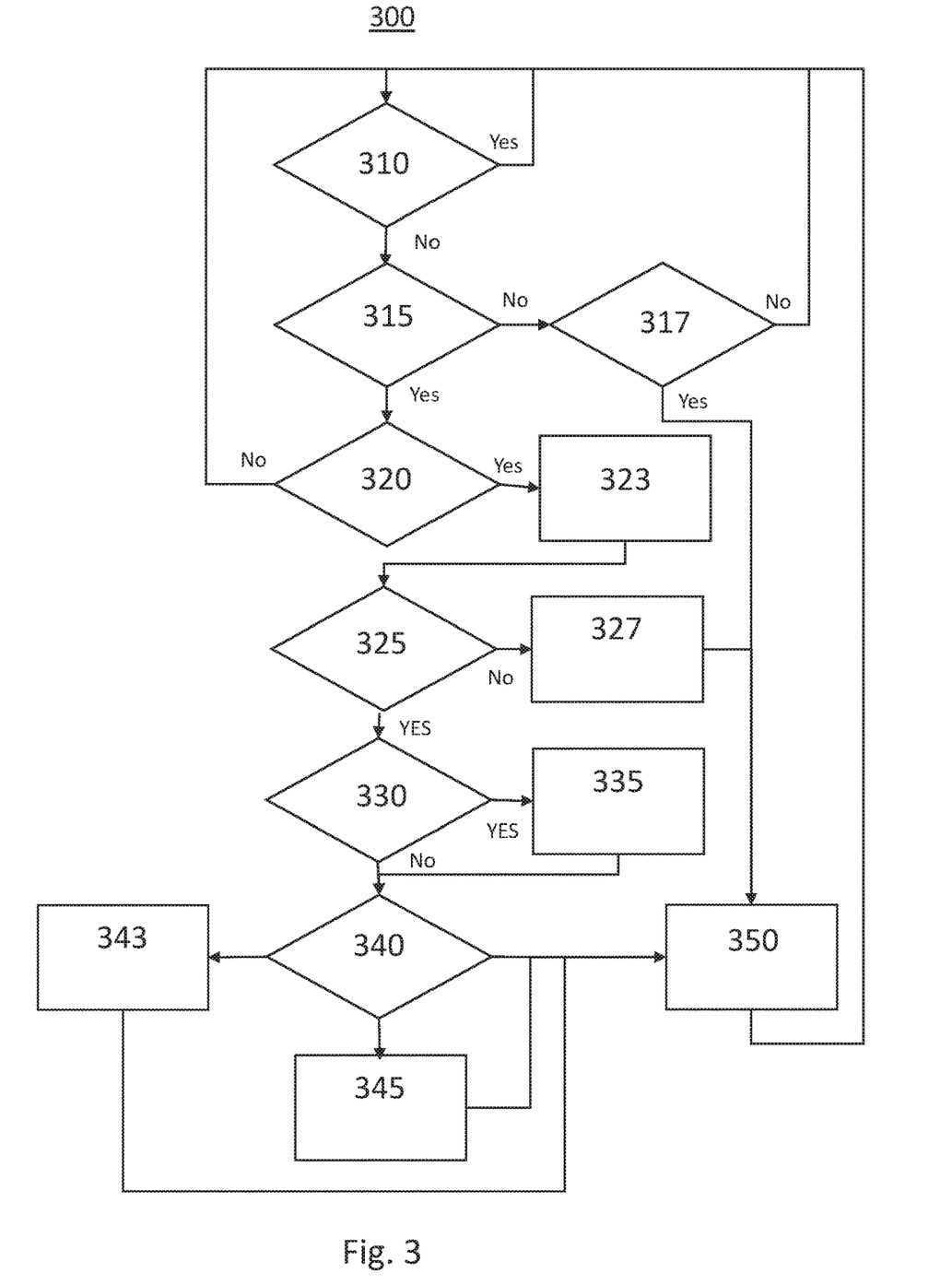
FIG. 3 shows a flow chart illustrating a method for active vehicle cabin occupant detection according to an exemplary embodiment of the present disclosure.

Turning now to FIG. 3, a flow chart illustrating an exemplary method for active vehicle cabin occupant detection 300 according to an exemplary embodiment of the present disclosure is shown. In this exemplary embodiment the method is first operative to determine if the driver is present 310 in the vehicle. This may be determined in response to a pressure switch mounted in the driver's seat, a motion detection device, detecting the presence of a key fob, data from a camera or the like. If it is determined that the driver is present in the vehicle, the algorithm is returned to the starting conditions 310. If the driver is not present in the vehicle, the method is then operative to determine 315 if the vehicle has been shut down. It may be determined that a vehicle is shutdown by monitoring an ignition switch state. If the ignition switch is in the off or lock position, the vehicle can be assumed to be in a shutdown state. Alternatively, shutdown or runs state information may be received from a vehicle processor, vehicle controller, or the like. The run state may also be determined in response to an alternator output voltage. If the alternator output voltage is zero volts, the engine may be assumed to be off and the vehicle is in a shutdown state.

If the vehicle is not in a shutdown state, the method is then operative to measure 317 a cabin carbon dioxide level. The carbon dioxide level may be determined in response to a carbon dioxide detector, such as a metal oxide semiconductor sensor, electrochemical sensor, or the like. If no carbon dioxide is detected in the vehicle cabin, the algorithm is operative to return to the starting conditions 310. If the presence of carbon dioxide is detected, or a threshold level of carbon dioxide is measured in the vehicle cabin and the method is operative to contact 350 emergency services. Emergency services may be contacted by calling 911 and providing a voice prompt indicating a running vehicle with carbon dioxide detected in the cabin. The voice prompt may further include the location of the vehicle, make, model, vehicle color, etc. Emergency services may be contacted through a networked service provider, such as OnStar, or by transmitting data directly to emergency services. Before contacting emergency services, the vehicle may transmit an alert to the driver indicative of the emergency situation. This may provide the driver time to remedy the situation before emergency services are contacted. If the driver is not detected, or the situation is not remedied within a predetermined time period, such as two minutes, after the alert is transmitted, the notification to emergency services may be transmitted.

If the vehicle is shutdown, the method is then operative to determine 320 if an occupant is present in the vehicle. In an exemplary embodiment, the presence of a vehicle occupant may first be initiated in response to a pre-detection subroutine. The pre-detection subroutine may be performed during operation of the vehicle and be operative to monitor door sensors, driver calendar, vehicle route, carbon dioxide sensor outputs, onboard vehicle sensors, such as accelerometers, or the like in order to predict a driving pattern or vehicle operation indicative of a vulnerable vehicle occupant. This pre-detection algorithm may then be used to trigger a driver alert or to trigger an occupant detection algorithm when the vehicle is stopped and the driver leaves the vehicle. In an additional exemplary embodiment, the system may operative to predict if there may be an occupant remaining in the vehicle in response to a personal calendar accessed through a mobile device, a daily routine, or a routine trip which may be indicative of a child occupant or a pet occupant. The occupant detection algorithm may include monitoring the output of pressure switches mounted in the seats, a motion detection device, camera or the like. If an occupant is detected by the occupant detection algorithm, the detection may be confirmed by infrared camera or the like. If no occupant is detected in the vehicle, the algorithm is operative to return to the starting conditions 310. If an occupant is detected in the vehicle, such as a child in the back seat, an alert is transmitted 323 to the driver. The alert may be transmitted to the driver by text message, telephone voice call, wireless signal to a key fob, activation of the vehicle horn and/or lights, etc. The alert may be indicative of the presence of an occupant, such as a pet, detected in the vehicle.

After the alert is transmitted to the driver, the method is then operative to determine 325 a temperature outside of the vehicle. The outside temperature may be used to determine if active temperature control is required for the vehicle cabin. In this exemplary embodiment, the method is operative to determine if the outside temperature is below a lower threshold temperature. If the outside temperature is below a threshold temperature, the method is operative to start 327 the vehicle engine and turn on the vehicle cabin heat. For example, if the outside temperature is below thirty degrees Fahrenheit, the temperature is deemed to be dangerously low and the vehicle heating system is employed. The method is then operative to contact emergency services 350.

If the outside temperature is not below a threshold value, the method may then be operative to determine 330 if the vehicle is in direct sunlight. The vehicle being in direct sunlight may be determined in response to a luminance detector installed on the vehicle roof, the dashboard of the vehicle or the like. The output of the luminance detector is indicative of the light intensity incident on the luminance detector. If the output of the luminance detector exceeds a threshold value, the method may assume that the vehicle is in direct sunlight.

If the vehicle is determined to be in direct sunlight, the method may then be operative to deploy 335 one or more sunshades inside the vehicle cabin in order to reduce heat generation in the vehicle cabin as a result of solar radiation entering the glass surfaces of the vehicle cabin. The sunshades may be deployed in response to a control signal from the vehicle controller in response to the light intensity indicative of direct sun exposure. After the sunshades are deployed, the method is then operative to measure an interior cabin temperature 340.

If the solar intensity is not indicative of direct sunlight, the method is next operative to determine 340 a cabin temperature inside of the vehicle cabin. The interior cabin temperature may be measured by a thermal sensor or the like installed within the vehicle cabin. The thermal sensor may generate a signal indicative of the cabin temperature to couple to the vehicle controller. If the internal temperature does not exceed a first threshold temperature, such as eighty five degrees Fahrenheit, the method is then operative to contact emergency services 350 and return to the in the algorithm is returned to the starting conditions 310. The method is continuously run and therefore will continue to monitor 340 the cabin temperature after performing the previous steps of the method. If the internal temperature does exceed a first threshold temperature, such as eighty five degrees Fahrenheit, the method is then operative to turn on the vehicle heating ventilation and air conditioning (HVAC) fan and to open the outside air inlets such that outside air is circulated in the vehicle cabin in order to reduce the cabin temperature. The method is then operative to contact emergency services 350 and the algorithm is returned to the starting conditions 310. If the cabin temperature exceeds a second, higher, threshold, such as one hundred degrees Fahrenheit, the method is then operative to start 345 the vehicle and turn on the vehicle air conditioning. The method may then operative to contact emergency services 350 and the algorithm is returned to the starting conditions 310.

When initiating a vehicle system, such as the HVAC fan or starting the engine to run the air conditioning, the method is operative to monitor the battery level and/or the gas level. If the battery voltage level drops lower than a threshold value, the vehicle may be operative to start the vehicle engine in order to recharge the battery. The vehicle may the stop the engine in response to the battery reaching a desired recharged level. The method may further be operative to monitor a fuel level when running the engine. If the fuel level drops below a threshold level, the estimated remaining run time may be transmitted to the driver and/or emergency services. In response to a low fuel level, the method may be operative to cycle, or periodically start and stop, the engine operation in order to extend the available cooling time.

Figure 4:
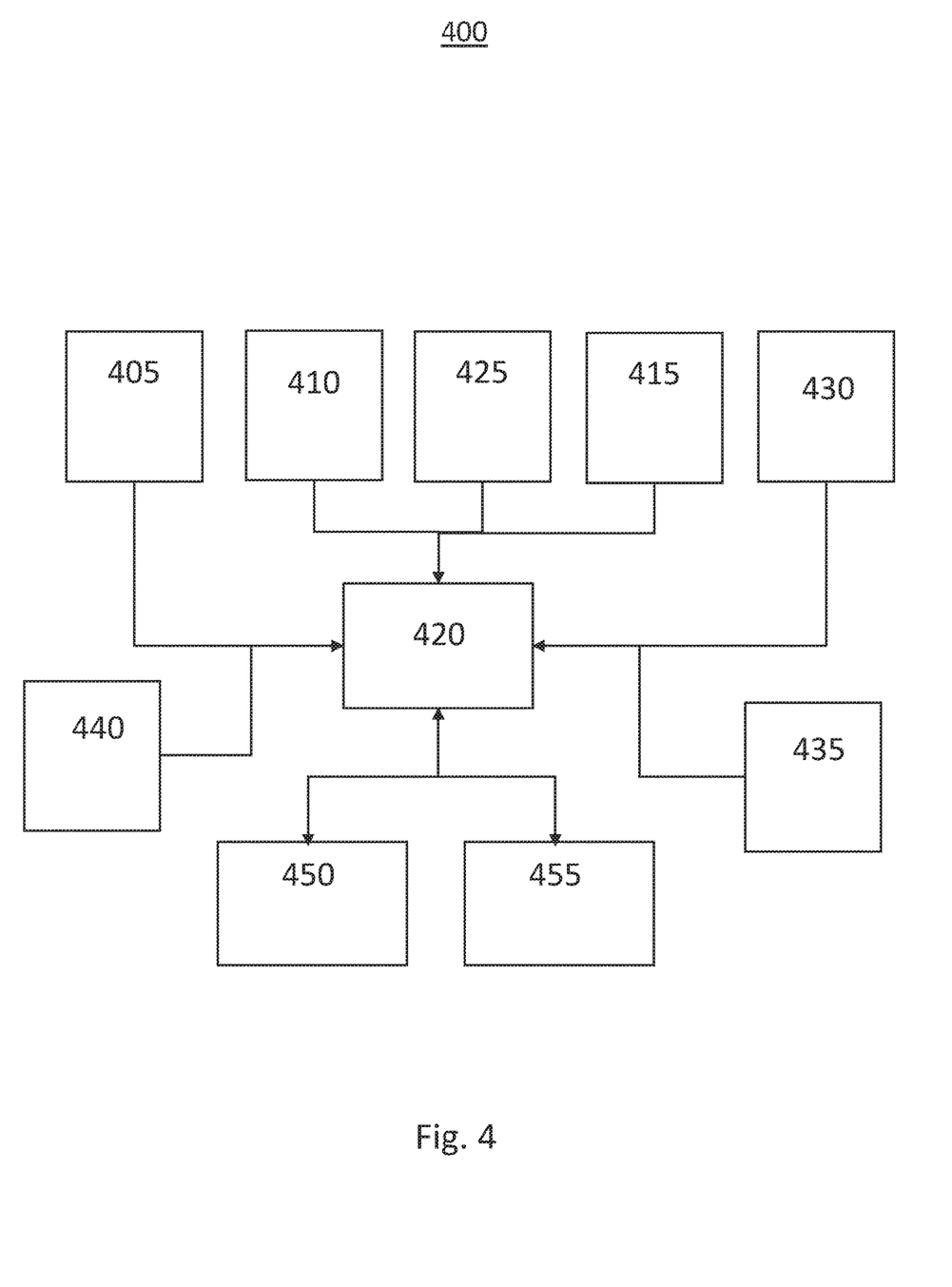
FIG. 4 shows a block diagram illustrating a system for active vehicle cabin occupant detection according to another exemplary embodiment of the present disclosure.

Turning now to FIG. 4, a block diagram of another exemplary system for active vehicle cabin occupant detection 400 according to the present disclosure is shown. The exemplary system 400 may be implemented within a vehicle and may include a motion sensor 405, a GPS 410, an acoustic sensor 425, a gravity sensor 415, CO sensor 430, processor 420, vehicle controller 440, HVAC system 450, and transmitter 455.

The motion sensor 405 is operative to detect motion within the vehicle cabin. The motion sensor 405 may include a camera, a passive photosensitive receiver, an ultrasonic transmitter and detector, or the like. The motion sensor 405 is operative to detect movement above a predetermined threshold and to generate a control signal in response to the detected movement. For example, an ultrasonic transmitter may transmit an ultrasonic sound wave within the vehicle cabin. The ultrasonic sound wave is then reflected from the interior surfaces and returned to the ultrasonic detector. Similar to Doppler radar, a heterodyne detection of a frequency shift of the received ultrasonic signal is indicative of movement within the vehicle cabin. The motion sensor 405 may generate an output signal when motion is detected for coupling to the processor 420.

The GPS 410 is operative to determine a location of the GPS receiver in response to a number of received satellite signals. The GPS output is a location which is coupled to the processor 420. The GPS output may be transmitted to the processor 420 or in response to a request by the processor 420. The acoustic sensor 425 may be a microphone, or a series of microphones, or the like which is operative to detect sounds within the vehicle cabin. These detected sounds may be analyzed to detect crying, barking, talking, etc., and may be used to determine the presence of an occupant in the vehicle cabin.

The system 400 may further include a gravity sensor 415 or pressure sensor located in one or more of the vehicle seating surfaces. Weight on the seating surface, such as a person seated in the seat, may be detected by the gravity sensor 415. The gravity sensor 415 may then generate a control signal indicative of the activation of the gravity sensor 415 or of the estimated force applied to the gravity sensor 415 and couple this information to the processor 420. The activation of the gravity sensor 415 may be indicative of a person sitting in the corresponding seat, or of an animal moving around the vehicle on the seating surfaces.

In an exemplary embodiment, the processor 420 is operative to receive signals from the motion sensor 405, the GPS 410, the acoustic sensor 425, the gravity sensor 415, the carbon dioxide sensor 430 and the vehicle controller 440. The processor 420 may be operative to monitor these signals in order to predetermine if a driver behavior or vehicle operation is indicative of a child being present in the vehicle. A child presence may be estimated in response to abnormal door usage, such as opening and closing a rear door when embarking on a trip, but not opening the rear door after arriving at a destination.

The processor 420 is operative to run an algorithm in order to detects a live object in a vehicle by using multiple sensors in order to increase the detectability of the live object left within a vehicle cabin. When the vehicle is in operation, the processor 420 is operative to perform a pre-detection algorithm by using artificial intelligence technology to check any abnormal door usage or distraction of the driver thereby increasing the probability of a forgotten vehicle occupant. The processor 420 may receive a location from the GPS 410 indicative that a vehicle starting point was a school, preschool, or the like. The processor 420 may determine a time of day in response to the GPS signal or other source of time and data and estimate that an additional occupant may be in the vehicle in response thereto. The processor may receive data from the motion sensor 405 or the gravity sensor 415 during the trip indicative of a second passenger within the vehicle during the trip.

Once the car is parked, or the engine is stopped, as indicated by the vehicle controller 440, the processor then attempts to detect any dynamic behavior within the vehicle in response to a signal from the motion sensor 405. The acoustic sensor 425 may be used to detect any sound such as crying, barking, etc., inside the vehicle cabin. The gravity (pressure) sensor 415 may be used to detect any additional weights in all seats.

In an exemplary embodiment, if the predetection algorithm estimates the possibility of a vehicle occupant, but the occupant is not sensed by the various detection sensors, the processor 420 may further confirm the absence of a vehicle occupant by operative of an infrared camera 435 to detect a thermal emission from a forgotten vehicle occupant. Alternatively, the infrared camera 435 may be used to confirm the presence of a vehicle occupant in a vehicle cabin to confirm the various sensor detections. In response to the detection and confirmation of a vehicle occupant, the processor 420 may then be operative to generate a control signal to couple to the transmitter 455 in order to transmit a control signal to the driver or emergency services. The control signal coupled to the transmitter 455 may include the location information received from the GPS 410. The processor 420 may also be operative to initiate a vehicle HVAC system 450 and/or vehicle engine in order to cool the vehicle cabin until the driver of emergency services has arrived.

Figure 5:
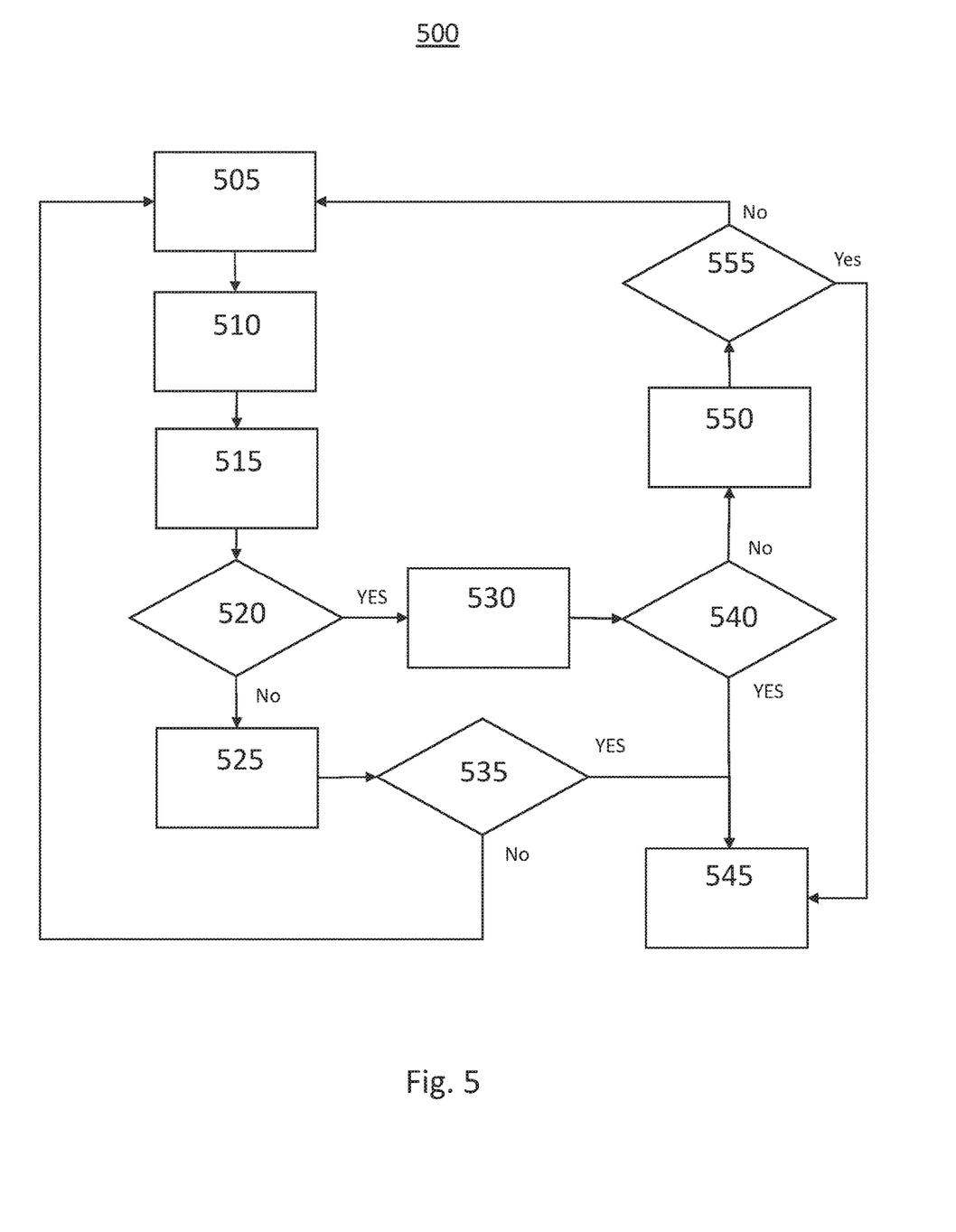
FIG. 5 shows a flow chart illustrating a method for active vehicle cabin occupant detection according to another exemplary embodiment of the present disclosure.

Turning now to FIG. 5, a flow chart illustrating another exemplary method for active vehicle cabin occupant detection in a motor vehicle 500 according to the present disclosure is shown. The method is first initiated when the vehicle is operating 505. In response to the vehicle operating, the method is operative to perform an occupant predetection 510 algorithm. The occupant predetection 510 is operative to estimate the possibility of a second vehicle occupant, such as a child or pet, during operation of the vehicle. This estimation may be made in response to previous and current driving patterns with or without second vehicle occupants, abnormal door usage, carbon dioxide levels, detected motion, activation of pressure sensors in seating surfaces, acoustic sensors, motion sensors, etc. The predetection method is concluded when the vehicle is stopped 515, the engine is turned off, the transmission is put into park, an emergency brake is engaged, or when the doors are locked and the drivers cannot be detected. If the predetection algorithm indicates that a second vehicle occupant may have been present, the method is then operative to attempt to detect 530 an occupant within the stopped vehicle cabin. If no occupant is detected 540, the method is then operative to initiate the infrared camera to confirm the absence of the occupant 550 in response to the infrared camera detection. If no occupant is detected 555 by the infrared camera, it can be estimated that no occupant is present in the stopped vehicle and the method is returned to wait for the vehicle to be operational 505.

If the predicted occupant algorithm estimates 520 that a second occupant is not present, the method is still operative to monitor the various sensor outputs to detect 525 an occupant within the stopped vehicle cabin. If no occupant is detected 525, it can be determined that no occupant is present in the stopped vehicle and the method is returned to wait for the vehicle to be operational 505.

If an occupant is detected 535, 540 in response to the various sensor outputs, or in response to the infrared camera 555, the method is operative to generate an alert 545 signal for transmission to the driver, emergency services, or the like. The alert may be a wireless transmission to a mobile device, a key fob or to a networked computer. The alert may be realized by activating the vehicle lights and/or horn.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An occupant detection system in a vehicle comprising:
a GPS sensor operative to detect a vehicle location during operation of the vehicle;
a door sensor operative to detect a vehicle door state;
a pressure sensor operative to detect a vehicle seat usage in response to a weight on a vehicle seat;
a motion sensor within a vehicle cabin operative to detect a detected presence of a vehicle occupant;
an infrared camera operative to detect a thermal signature of the vehicle occupant;
a processor operative to predict a predicted presence of the vehicle occupant in response to the vehicle location, the vehicle door state, and the vehicle seat usage and for initiating a use of the infrared camera to confirm the detected presence of the vehicle occupant in response to the predicted presence; and
a transmitter operative to transmit an alert in response to a detection of the thermal signature of the vehicle occupant.

2. The apparatus of claim 1 wherein the vehicle location during operation of the vehicle is indicative of a school.

3. The apparatus of claim 1 wherein the vehicle door state is indicative of a passenger door opening and closing.

4. The apparatus of claim 1 including a vehicle ignition switch having an off position wherein the motion sensor is operative to detect the presence of the vehicle occupant in response to the vehicle ignition switch being placed in the off position.

5. The apparatus of claim 1 further including a CO sensor and wherein the predicted presence of the vehicle occupant is detected in response to a CO level measured by the CO sensor.

6. The apparatus of claim 1 further comprising an HVAC system and wherein the HVAC system is engaged to reduce a temperature of the vehicle cabin in response to the detection of the thermal signature of the vehicle occupant.

7. The apparatus of claim 1 wherein the alert is transmitted to an emergency services provider.

8. The apparatus of claim 1 wherein the alert is transmitted to a mobile device.

9. A method comprising:
predicting a predicted presence of a vehicle occupant during operation of a vehicle in response to a door sensor indicative of a door opening and a pressure sensor in a passenger seat indicative of the vehicle occupant in the passenger seat;
detecting a detected presence of the vehicle occupant using a vehicle cabin motion detector in response to the predicted presence of the vehicle occupant and the vehicle being shutdown;
confirming the detected presence of the vehicle occupant using an infrared camera to detect a thermal signature of the vehicle occupant in response to the predicted presence of the vehicle occupant; and
transmitting an alert via a wireless transmitter indicative of the detected presence of the vehicle occupant.

10. The method of claim 9 wherein the alert is transmitted to an emergency service provider.

11. The method of claim 9 wherein the alert is transmitted to a mobile device.

12. The method of claim 9 wherein the prediction of the presence of a vehicle occupant is made in response to a trip point of origin.

13. The method of claim 9 wherein the prediction of the presence of the vehicle occupant is made in response to a carbon dioxide level measured by a vehicle cabin carbon dioxide detector.

14. The method of claim 9 further including engaging an HVAC system in response to confirming the presence of the vehicle occupant.

15. The method of claim 9 wherein the prediction of the presence of the vehicle occupant is made in response to a driving pattern indicative of the vehicle occupant.

16. A method of detecting a vehicle occupant in a vehicle cabin comprising:
predicting a predicted presence of the vehicle occupant during operation of the vehicle in response to a door sensor indicative of a door opening and a pressure sensor in a passenger seat indicative of the vehicle occupant in the passenger seat;
detecting a detected presence of the vehicle occupant using a vehicle cabin motion detector in response to the predicted presence of the vehicle occupant and the vehicle being shutdown;
confirming the detected presence of the vehicle occupant in response to a thermal image captured by a camera within the vehicle cabin; and
transmitting an alert using a wireless transmitter in response to confirming the detected presence of the vehicle occupant.

17. The method of detecting a vehicle occupant in a vehicle cabin of claim 16 further including activating an HVAC system in response to confirming the presence of the vehicle occupant.

18. The method of detecting a vehicle occupant in a vehicle cabin of claim 16 further including predicting a presence of the vehicle occupant is made in response to a point of origin of operation of the vehicle.

19. The method of detecting a vehicle occupant in a vehicle cabin of claim 16 further including detecting the presence of the vehicle occupant in response to a motion detector within the vehicle cabin and wherein the detecting the vehicle occupant is made in response to the vehicle being in a nonoperational mode.

20. The method of detecting a vehicle occupant in a vehicle cabin of claim 16 further including detecting the presence of the vehicle occupant in response to a motion detector within the vehicle cabin and wherein the detecting the vehicle occupant is made in response to the vehicle being in a nonoperational mode and a vehicle cabin door being locked.

* * * * *